(12) United States Patent
Lindholm et al.

(10) Patent No.: US 8,594,334 B2
(45) Date of Patent: Nov. 26, 2013

(54) KEY MANAGEMENT METHOD

(75) Inventors: Fredrik Lindholm, Älvsjö (SE);
Mattias Johansson, Johanneshov (SE);
Karl Norrman, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 230 days.

(21) Appl. No.: 13/141,435

(22) PCT Filed: Dec. 23, 2008

(86) PCT No.: PCT/SE2008/051558
§ 371 (c)(1),
(2), (4) Date: Jun. 22, 2011

(87) PCT Pub. No.: WO2010/074621
PCT Pub. Date: Jul. 1, 2010

(65) Prior Publication Data
US 2011/0255695 A1 Oct. 20, 2011

(51) Int. Cl.
*H04L 9/08* (2006.01)
(52) U.S. Cl.
USPC ............ 380/278; 380/277; 380/279; 380/281
(58) Field of Classification Search
USPC .................................. 380/277, 278, 279, 281
See application file for complete search history.

(56) References Cited

U.S. PATENT DOCUMENTS

| | | | |
|---|---|---|---|
| 6,263,435 B1 * | 7/2001 | Dondeti et al. ............... | 713/163 |
| 2002/0147906 A1 * | 10/2002 | Lotspiech et al. ............ | 713/158 |
| 2006/0285683 A1 | 12/2006 | Anatharaman et al. | |

FOREIGN PATENT DOCUMENTS

| | | |
|---|---|---|
| CN | 1716853 A | 1/2006 |
| JP | 2003-503949 A | 1/2003 |
| WO | WO 01/03364 A1 | 1/2001 |
| WO | WO 2005/109735 A1 | 5/2004 |
| WO | WO 2006/054927 A1 | 5/2006 |

OTHER PUBLICATIONS

International Search Report, PCT Application No. PCT/SE2008/051558, Aug. 26, 2009.
Written Opinion of the International Searching Authority, PCT Application No. PCT/SE2008/051558, Aug. 26, 2009.
Atallah et al., "Dynamic and Efficient Key Management for Access Hierarchies", *ACM Transactions on Information and System Security*, vol. 21, No. 3, Jan. 2009, pp. 18:1-18:43.
Hassan et al., "Hi-KD: Hash-based hierarchical Key Distribution for Group Communication", Short Paper, *IEEE-INFOCOM'05*, Mar. 2005, 4 pp.

(Continued)

*Primary Examiner* — Brandon Hoffman
*Assistant Examiner* — Samuel Ambaye
(74) *Attorney, Agent, or Firm* — Myers Bigel Sibley & Sajovec, P.A.

(57) ABSTRACT

The present invention relates to a key management method to establish selective secret information in multiple disjoint groups, more specifically to a method of reducing the broadcast size in access hierarchies and localize and facilitate management in said access hierarchies. The key management method selects a number of subgroups. Each subgroup supports an instance of a key distribution method for receiving distributed key material, and is capable of computing a usage security key based on the distributed key material and predefined user group key material.

29 Claims, 9 Drawing Sheets

(56) References Cited

OTHER PUBLICATIONS

Hassan et al., "An Efficient Key Management Algorithm for Hierarchical Group Communication", *IEEE First International Conference on Security and Privacy for Emerging Areas in Communications Networks* (SECURECOMM), Sep. 2005, pp. 270-276.

Naor et al., "Revocation and Tracing Schemes for Stateless Receivers", *Proceedings of the 21st Annual International Cryptology Conference on Advances in Cryptology* (CRYPTO '01), LNCS 2139, Aug. 2001, pp. 41-62.

Wallner et al., "Key Management for Multicast: Issues and Architectures", *Network Working Group, Request for Comments: 2627*, IETF, Jun. 1999, 23 pp.

* cited by examiner

US 8,594,334 B2

KEY MANAGEMENT METHOD

CROSS REFERENCE TO RELATED APPLICATION

This application is a 35 U.S.C. §371 national stage application of PCT International Application No. PCT/SE2008/051558, filed on 23 Dec. 2008, the disclosure and content of which is incorporated by reference herein in its entirety. The above-referenced PCT International Application was published in the English language as International Publication No. WO 2010/074621 A1 on 1 Jul. 2010.

TECHNICAL FIELD

The present invention relates to a method to establish selective secret information in multiple disjoint groups, more specifically to a method of reducing the broadcast size in access hierarchies and localize and facilitate key management in said access hierarchies.

BACKGROUND

Due to the threat of illegal recording of broadcast content, there is a trend to move security endpoints closer to the actual point of usage, in order to prevent interception and possible distortion/disruption of the broadcast information before it reaches the end user. An example of this could for instance be when an end user watches a TV show on his laptop, and at the same time listens to the sound in his headphones. In this case, it is desired that both the video stream and the audio stream is encrypted all the way to the endpoint, i.e., the video stream should be decrypted close to the screen and the audio stream should be decrypted inside the headphones.

Another, and somewhat conflicting requirement, is that there in future networks will exist a need to allow intermediate media routers to be able to modify the content, e.g., to allow for different codecs (coders/decoders). Not all media routers are however trusted to the same degree, and they therefore have different access rights. One such example is when certain media routers are allowed to have access to both the media integrity and confidentiality keys, a second set of routers are only allowed to have access to the media integrity keys, and a third set are not allowed to have access to any keys at all. To change the cryptographic state of media routers of different degrees of trust (i.e. having different access to broadcast information), thus requires separate treatment of said routers. Contrary to the endpoints discussed above, the access to the media keys should in the intermediate media routers be irrespective of whether it is a video or an audio stream that is accessed, only the degree of trust is important for the routers.

Moreover, it is desired to be able to treat the end point devices and the media ports as different groups. One reason for this desire, is that it provides good security practice. In addition, since it is likely that they will differ in user behaviour and, not treating them as different groups, may otherwise impact scalability in a bad way. These security problems/requirements of future media delivery technologies discussed above are for example mentioned in [1].

Broadcast encryption is often directed towards media delivery, since historically media delivery has been on a broadcast basis. Examples of broadcast media are radio-based TV and radio and traditional newspapers. However, there can be other applications as well where broadcast encryption is used as a tool to facilitate information collection, such as for collection and processing of data from sensors.

Known methods to make broadcast encryption more efficient, e.g., Logical Key Hierarchy (LKH) [2] and Subset Difference (SD) [3], are useful for forming user groups and for providing these with group keys. Each such method has characteristics suitable for specific group characteristics. Exemplary, SD is useful if the group is highly dynamic in terms of the number of joining and/or leaving group members.

It is often desired to form new sub-groups from two or more prevailing (super) groups. However, a disadvantage of known methods for key management is that each instance of the broadcast encryption protocol must be managed for each such new group causing a scaling problem.

Broadcast Encryption

Group security deals with the problem of establishing an up to date cryptographic state among a group of users. When a group security scheme is used in a broadcast setting, the scheme is called a broadcast encryption scheme. In most broadcast encryption protocols the existence of a central role controlling the group and managing all the cryptographic keys is assumed. This central role is referred to as the Group Controller/Key Server (GCKS).

A common way to utilise a broadcast encryption scheme is to first broadcast a header containing a cryptographic key $K_M$ encrypted in such a way so that only the entitled receivers can decrypt the header. The actual message (e.g. a media stream) M is then protected using this cryptographic key $K_M$. The header could be encrypted in a "naïve" way, where every member of the group shares an individual secret key together with the GCKS. Whenever the cryptographic state is to be changed, the GCKS transmits the new state to each remaining member in the group protected under the key shared with that particular member. When the size of the broadcast is mentioned in this application, then it is normally the size of the header and not to the size of the message M that is referred to, since the size of the message M is independent of which broadcast encryption protocol that is used. The problem with the above described naïve solution is that the header will contain as many messages as members in the group, and this is not acceptable in large groups, since it will require too large broadcast size. A pictorial view of the traditional naïve method is given in FIG. 1. Here, the circles denote a user $u_i$ who shares the key $K_i$ with the GCKS.

Due to the large broadcast size in the naïve method, new protocols that are more effective have been developed. These methods include for example the Logical Key Hierarchy (LKH) protocol, as described in [2], which makes the change of the cryptographic state, or the transmission of the header, more efficient. The LKH protocol is suitable for small group systems in which only small changes of the group patterns occur. Another example of a more efficient protocol is the Subset Difference (SD) protocol, as described in [3]. The SD protocol is useful to use in groups with very large membership fluctuations between each update interval. None of the described protocols are however efficient enough to be used in practice due to the large broadcast size. The limiting parameters are the size of the group, the required updating intervals, group characteristics and existing bandwidth.

Key Management for Access Hierarchies

There has recently been published a number of articles on key-management for access hierarchies with different degree of sophistication. In [4], a simple method for managing group keys in a hierarchical way along one dimension was introduced. The benefit from using this method is that one minimizes the required memory on both the server and receiver side. In [5] on the other hand, a much more advanced solution was presented. This solution allows a user to compute keys corresponding to an access hierarchy based on any directed graph with only a minimum of secret keys. On the backside compared to the solution in [4], a user needs to store data proportional to the size of the graph. A solution similar to [5] but simpler was described in [6], where one instance of a GKM scheme is used to deliver a group key, and then a hash function and a long term secret are used to differentiate between different sub groups.

Problems with Existing Solutions

The scenario described above, with security endpoints very close to the media rendering device and intermediate media routers, requires very frequent updates and multiple key transmissions (in the described example FIG. 3, both the integrity and the confidentiality key of both the audio and video stream need to be broadcast) in order to fulfil the requirements. In addition, it is desired to treat the group of media ports and end point devices as different groups with no apparent relationship between their respective keys to maintain a good security policy. No known methods for group key management such as LKH and SD and/or in combination with key management for access hierarchies can achieve this in an efficient way.

SUMMARY

The prior art thus fails to disclose any efficient methods that provide group key management the capability of splitting security endpoints, i.e. enabling for example video and audio streams to be separated and sent to different audio- and video-receiving entities, to handle media routers with different trust levels without affecting broadcast size, and facilitating and localizing key management in the sense that different groups with different purposes may receive different keys.

An objective of the invention is to form, from two or more first user groups each having a first group key, at least one second user group wherein each user in a second user group is provided with at least a common second group key.

Another objective of the invention is to provide for distribution of at least a common group key to each such second group such that only one instance of a GKM protocol is required for each first group independent of the number of second groups.

The present invention meets the above-mentioned criteria by providing a method to make group key management more efficient when the groups show certain common characteristics. In the following, the present invention is exemplified with an example concerning media delivery via media routers, but the invention may be applicable in other contexts.

According to a first aspect, the present invention provides a method to create a usage security key for a second user group of members selected from the assembly of first user groups.

Said first groups may be characterised in the way users behave, e.g., in terms of joining or leaving the group or belonging to distinct groups that should, due to security policies, be kept apart. Exemplary users may be a set of routers that has a long-lived similar behaviour or devices belonging to end users. The second user groups may be characterised by their capabilities or trust levels. Exemplary second user groups may be servers with different media modification capabilities or end user devices being able to decrypt an audio signal such as headphones and loudspeakers in a TV set.

In a first embodiment, said method comprises the steps of:
dividing said users belonging to various first groups into different subgroups based on their user rights and/or behaviour;
creating a set of random long-term secrets $x_m$ each associated with the first user group the individual user belongs to;
creating a set of random long-term secrets $s_i$ each associated with the second user group and hence also with the usage key $K_i$;
generating a set of long-term secrets $L_{i,m}$ as a function q of the individual users' respective secrets $s_i$ and $x_m$;
providing said individual users of said subgroups with their respective secrets $L_{i,m}$, which they will then store.
generating a set of group keys $K_{Gm,j}$ as a function $f$ of a random round secret $r_j$ and the respective first usage group's secrets $x_m$;
broadcasting an encoded message comprising said first group keys $K_{Gm,j}$;
whereby each user of the respective subgroups decrypts the encoded message and computes the usage key $K_{i,j}$ associated with their second user group by using the long-term key $L_{i,m}$, $K_{Gm,j}$ and a function g.

In different embodiments of said method, said secrets $s_i$, $r_j$, and $x_m$ are based on random strings or discrete logarithms, and the functions q, $f$ and g are then in turn based on different methods.

A simplified picture of what is achieved is depicted in FIG. 2. Two different first user groups with similar behaviour are managed using a traditional GKM protocol. Examples of two different groups may be consumers (recipients of IPTV services for instance) and intermediate processing servers. Each of these two first user groups then has a common key $K_{G1}$ and $K_{G2}$ respectively. In these two first user groups there then exist subgroups consisting of entities with different capabilities.

Subgroups from both first user groups then form so called second user groups. With the help of the long term keys entities from both first user groups can compute usage keys according to their capabilities and hence their associated second user groups. Without the solution presented in this document, the described situation would have required at least four instantiations of a GKM scheme instead of two.

Hence, the basic concept of the present invention is that traditional group key management methods (such as [2,3]) is made more efficient by treating many small groups as a few larger by the introduction of long-term secrets. The selective distribution of the long-term secrets to various members of different groups, divides said first user groups into subgroups within the larger groups in a system. In this way, different keys may be distributed to different first user groups, while the second user groups are still able to compute the same keys in the end. When new users are joining a first user group, said newcomers are categorized and divided among the existing subgroups depending on their long-term user behaviour. They will then be provided with their respective long-term secrets.

The method that is presented can be used together with any GKM scheme, and is more efficient than other solutions because of the fact that changes are not transported further in the key hierarchy, but can be dealt with locally, i.e. only the first user group is affected, and that the number of instances of GKM schemes can be kept at a minimum.

ADVANTAGES OF THE INVENTION

The invention makes the group key management more efficient in certain situations. Specifically, it makes it possible to:

Split security endpoints without affecting broadcast size.

Handle intermediate routers with different trust levels without affecting broadcast size.

Facilitate management and improve the security of the key management system in the sense that different first user groups with different purposes may receive different keys.

In the wider sense of key management for access hierarchies, it improves the key management method introduced in [5], by allowing changes to be dealt with locally in the first user group and not impacting a change to all members of the second user group.

A change in a system when using the method according to the present invention has a very small effect on the broadcast size compared to a change performed in conventional systems. The reason for this is that the present invention is based on dividing the different components (routers, end users, media ports, etc.) of a system into different groups and providing said groups with different long-term secrets. The administration of such long-term secrets is simple, the broadcast size required is small, and said secrets do not have to be changed often. Thus, the broadcast size required using the present invention method is significantly smaller than in the case of using conventional techniques.

The invention is particularly suited for systems where it is possible to logically divide the users into subgroups, thus enabling the assignment of different long-term secrets. Since this type of "pinpointed" broadcasting is used, the broadcasting size is considerably reduced, as well as the required bandwidth.

The present invention may be used with a traditional group key management method.

BRIEF DESCRIPTION OF THE DRAWINGS

FIG. 2 is an embodiment of the method according to the present invention where two first user groups with similar behaviour (users and media ports for instance) are shown. These two first user groups are managed with a traditional group key management method. Members of these first user groups are then given long-term keys so that they can compute the specific usage keys associated with the second user groups they belong to.

DETAILED DESCRIPTION OF THE INVENTION

Terminology

Figure 1:
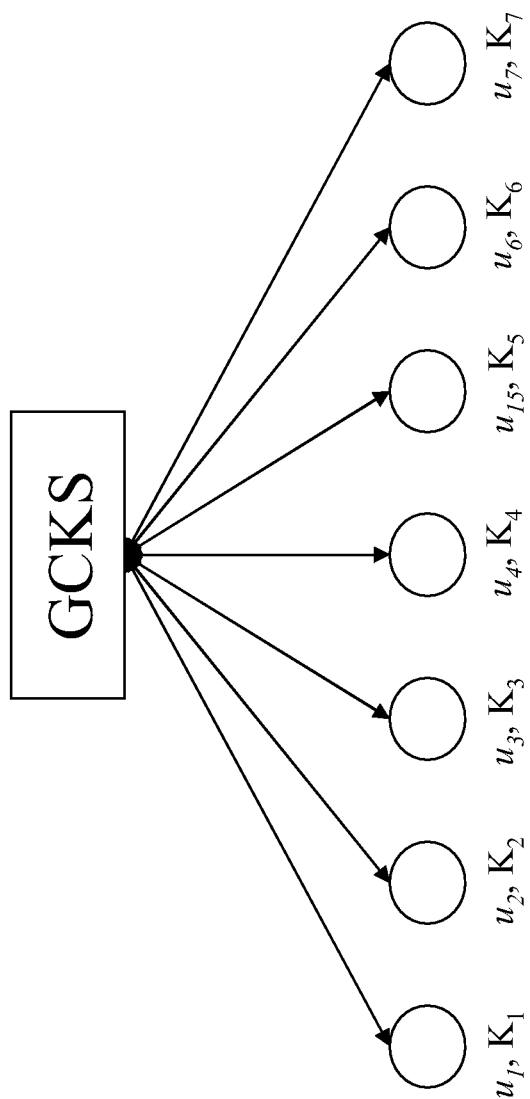
FIG. 1 shows a naïve method according to the prior art in which each member $u_x$ shares a key with the GCKS. If a new group key $K_G$ is to be delivered to all the users, it has to be encrypted by all their respective keys. The header in the broadcast encryption protocol will then be $E(K_G, K_1)|E(K_G, K_2)|E(K_G, K_3), \ldots$ where $E(a, b)$ is the encryption of a using the encryption function E and the encryption key b.

Group: A number of users grouped together by the fact that they are given a specific cryptographic state such as a key. In the method according to the present invention, it is distinguished between first user groups and second user groups. In a first user group, the group members have similar behavior, and are thus managed by the same traditional group key management method. The second user group comprises the union of subgroups from the first user groups, where said subgroups are distinguished by their capabilities and hence long term secrets.

Group key: This is the key belonging to the first user group. It is denoted by $K_{Gm}$, where $G_m$ denotes the first user group.

Round: The memberships of the first user groups change over time. The membership is adjusted in discrete time intervals, which is called a round. The round in which a system exists in is denoted by the letter j. The group keys and the usage keys change with each round, and when this is important to point out, it is indicated with an extra index j.

Round key: This is the secret that is changing from round to round, and in turn inflicts change on the group keys and usage keys. It is denoted by $r_j$.

Long-term usage secret: This is a secret used to generate the long-term key. The long-term usage secret is denoted by s, with an i as index if it is desired to specify which usage key it is related to. s is only based on the second user group. The secret is stored and known only by the GCKS.

Long-term group secret: This is a secret used to generate the long-term key. It is denoted by x, with an m as an index if it is desired to specify which first user group it is related to. The secret is stored and known only by the GCKS.

Long-term key: The long-term key is the key from which the members of a second user group compute the usage keys. It is generated from the long-term usage secret and the long-term group secret and denoted by $L_{i,m}$. The secret is stored by the GCKS and the individual users of the respective subgroups comprising the second user group, but only the GCKS knows the secrets on which it is based and is therefore the only one that can compute L. L is broadcast as an encrypted message to the various subgroups, when registering for a service or registering a piece of hardware, or may be incorporated in the hardware itself in secure parts, depending on the application.

Usage key: This is the key which is held by all members of a second user group. It is used to encrypt or integrity protect data. It is denoted by $K_i$.

GCKS: The Group Controller/Key Server, the entity managing the groups, including the key management. The GCKS is in single control over the secrets r, s, and x. The GCKS may be divided into two physical entities, see for instance FIG. 9. In this case a first entity is handling s and x, and a second entity receives x from this first entity and generates r itself.

The present invention relates to a key management method wherein a number of user subgroups is selected, from a plurality $G_m$ of user groups each [dependent] supporting an instance of a key distribution method M for receiving distributed key material, and wherein each subgroup is capable of computing a usage security key based on the distributed key material and pre-defined user group key material.

The usage security key for users in the subgroup may be generated, broadcasted and used according to the following steps:
- distributing, to each [selected] user entitled to (an instance of) a usage security key $K_i$, a long term secret $L_{i,m}$;
- broadcasting, according to a key distribution method M, an instance j of a group key $K_{G_m,j}$ to each user in group $G_m$;
- a user i in group $G_m$ computing an instance $K_{i,j}$ of the usage security key $K_i$, as a function of $L_{i,m}$ and $K_{G_m,j}$;
- user i using the usage security key $K_{i,j}$ for processing information.

In such a method, the instance j of a group key $K_{G_m,j}$ may be calculated as $f(x_m,r_j)$, wherein $r_j$ is a random number associated with instance j, $x_m$ is a long term secret and $f$ is a surjective one-to-one mapping in the second argument $f:G \times G \to G$ of an algebraic group G. An instance of the group key $K_{G_m,j}$ may be calculated as $K_{G_m,j}=r_j$ XOR $x_m$. Alternatively, $K_{G_m,j}=g^{r_j x_m}$, wherein g is a generator of a group $Z_p^*$.

Alternatively, $K_{i,j}$ may be calculated as $g(L_{i,m},f(x_m,r_j \in G))=h(s_i,r_j \in G)=K_{i,j}$, wherein g, h are surjective one-to-one mappings in the second argument $G \times G \to G$ and the long term secret $L_{i,m}$ is calculated as $L_{i,m}=q(s_i, x_m)$ wherein $s_i$ is a long term secret and wherein q is a mapping $q:G \times G \to G$, such that: $\exists q \forall s_i \forall x_m : g(q(s_i,x_m),f(x_m,r_j))=h(s_i,r_j)$. The long term secret $L_{i,m}$ may be calculated as $L_{i,m}=s_i$ XOR $x_m$, whereby said instance $K_{i,j}$ of a usage key $K_i$ is calculated as $K_{i,j}=K_{G_m,j} \oplus L_{i,m}=r_j \oplus x_m \oplus s_i \oplus x_m=s_i \oplus r_j$. Alternatively, $L_{j,m}=s_i x_m^{-1}$, whereby said instance $K_{i,j}$ of a usage key $K_i$ is calculated as $$K_{i,j}=K_{G_m,j}{}^{L_{j,m}}=g^{r_j x_m x_m^{-1} s_i}=g^{r_j s_i}.$$

The present invention also relates to a "central" group control and key server for use in a key management method according to the present invention for creation of key material associated with user groups $G_m$ and subgroups selected therefrom. Said "central" group control and key server method comprises:
- means for generation of at least a long term secret $L_{i,m}=q(s_i; x_m)$ where $s_i$ is a long term secret associated with a usage key $K_i$, $x_m$ is a long term secret associated with user group $G_m$ and q is a function as defined in the method according to the present invention,
- means for output of $L_{i,m}$ for providing [selected] users in group $G_m$,
- means for output of $x_m$,
- means for output of an instance j of a group key $K_{G_m,j}$.

In said "central" server the instance j of a group key $K_{G_m,j}$ may be calculated as $f(x_m,r_j)$, wherein $r_j$ is a random number associated with instance j, $x_m$ is a long term secret and $f$ is a surjective one-to-one mapping in the second argument $f:G \times G \to G$ of an algebraic group G. The instance of a group key $K_{G_m,j}$ may be calculated as $K_{G_m,j}=r_j$ XOR $x_m$. Alternatively, $K_{G_m,j}=g^{r_j x_m}$, wherein g is a generator of a group $Z_p^*$.

The "central" group control and key server may calculate $K_{i,j}$ as $g(L_{i,m},f(x_m,r_j \in G))=h(s_i,r_j \in G)=K_{i,j}$ wherein g, h are surjective one-to-one mappings in the second argument $G \times G \to G$ and the long term secret $L_{i,m}$ is calculated as $L_{i,m}=q(s_i, x_m)$ wherein $s_i$ is a long term secret and wherein q is a mapping $q:G \times G \to G$, such that: $\exists q \forall s_i \forall x_m : g(q(s_i,x_m),f(x_m,r_j))=h(s_i,r_j)$. The long term secret $L_{i,m}$ may be calculated as $L_{i,m}=s_i$ XOR $x_m$, whereby said instance $K_{i,j}$ of a usage key $K_i$ is calculated as $K_{i,j}=K_{G_m,j} \oplus L_{i,m}=r_j \oplus x_m \oplus s_i \oplus x_m=s_i \oplus r_j$. Alternatively, $L_{j,m}=s_i x_m^{-1}$, whereby said instance $K_{i,j}$ of a usage key $K_i$ is calculated as $K_{i,j}=K_{G_m,j}{}^{L_{j,m}}=g^{r_j x_m x_m^{-1} s_i}=g^{r_j s_i}$.

The present invention also relates to a "local" group control and key server for use in a key management method according to the present invention. Said "local" key server supports broadcasting method M for key distribution to user groups $G_m$ and subgroups selected therefrom, comprising:
- means for receiving from a "central" group control and key server a long term secret $x_m$,
- means for forming an instance j of a group key $K_{G_m,j}=f(r_j; x_m)$ associated with group $G_m$ and wherein $f$ is a function as defined in the method according the present invention,
- means for generating a round key $r_j$,
- means for broadcasting, using the method M, said group keys to selected members of groups $G_m$.

In an alternative embodiment, the "local" and "central" key servers are not separated, but are co-localized and share the "group" control functionality.

In said local server, the instance j of a group key $K_{G_m,j}$ may be calculated as $f(x_m,r_j)$ wherein $r_j$ is a random number associated with instance j, $x_m$ is a long term secret and $f$ is a surjective one-to-one mapping in the second argument $f:G \times G \to G$ of an algebraic group G. The instance of a group key $K_{G_m,j}$ may be calculated as $K_{G_m,j}=r_j$ XOR $x_m$. Alternatively, $K_{G_m,j}=g^{r_j x_m}$, wherein g is a generator of a group $Z_p^*$.

$K_{i,j}$ may also be calculated as $g(L_{i,m},f(x_m,r_j \in G))=h(s_i,r_j \in G)=K_{i,j}$, wherein g, h are surjective one-to-one mappings in the second argument $G \times G \to G$ and the long term secret $L_{i,m}$ is calculated as $L_{i,m}=q(s_i, x_m)$ wherein $s_i$ is a long term secret and wherein q is a mapping $q:G \times G \to G$ such that: $\exists q \forall s_i \forall x_m : g(q(s_i,x_m),f(x_m,r_j))=h(s_i,r_j)$. The long term secret $L_{i,m}$ may be calculated as $L_{i,m}=s_i$ XOR $x_m$, whereby said instance $K_{i,j}$ of a usage key $K_i$ is calculated as $K_{i,j}=K_{G_m,j} \oplus L_{i,m}=r_j \oplus x_m \oplus s_i \oplus x_m=s_i \oplus r_j$. Alternatively, $L_{j,m}=s_i x_m^{-1}$, whereby said instance $K_{i,j}$ of a usage key $K_i$ is calculated as $K_{i,j}=K_{G_m,j}{}^{L_{j,m}}=g^{r_j x_m x_m^{-1} s_i}=g^{r_j s_i}$.

The present invention also relates to a usage entity supporting a key management system according to the present invention, and supporting a broadcast method M belonging to a user group $G_m$ for processing information protected by an instance of a usage security key $K_i$ comprising:
- means for receiving and storing a long term secret $L_{i,m}$,
- means for receiving a broadcast message according to a broadcast method M using said group key management system, including an instance of a group key $K_{G_m,j}$,
- means for generating an instance $K_{i,j}$ of the usage security key $K_i$ by applying a function to said $L_{i,m}$ and $K_{G_m,j}$,
- means for receiving protected information for processing using the instance $K_{i,j}$ of usage key $K_i$.

In such a usage entity, the instance j of a group key $K_{G_m,j}$ may be calculated as $f(x_m,r_j)$ wherein $r_j$ is a random number associated with instance j, $x_m$ is a long term secret and $f$ is a surjective one-to-one mapping in the second argument $f:G \times G \to G$ of an algebraic group G. The instance of a group key $K_{G_m,j}$ may be calculated as $K_{G_m,j}=r_j$ XOR $x_m$. 28. Alternatively, $K_{G_m,j}=g^{r_j x_m}$, wherein g is a generator of a group $Z_p^*$.

$K_{i,j}$ may also be calculated as $g(L_{i,m},f(x_m,r_j \in G))=h(s_i,r_j \in G)=K_{i,j}$ wherein g, h are surjective one-to-one mappings in the second argument $G \times G \to G$ and the long term secret $L_{i,m}$ is calculated as $L_{i,m}=q(s_i, x_m)$ wherein $s_i$ is a long term secret and wherein q is a mapping $q:G \times G \to G$, such that: $\exists q \forall s_i \forall x_m : g(q(s_i,x_m),f(x_m,r_j))=h(s_i,r_j)$. The long term secret $L_{i,m}$ may be calculated as $L_{i,m}=s_i$ XOR $x_m$, whereby said instance $K_{i,j}$ of a usage key $K_i$ is calculated as $K_{i,j}=K_{G_m,j} \oplus L_{i,m}=r_j \oplus x_m \oplus s_i \oplus x_m=s_i \oplus r_j$. Alternatively, $L_{j,m}=s_i x_m^{-1}$, whereby said instance $K_{i,j}$ of a usage key $K_i$ is calculated as $K_{i,j}=K_{G_m,j}{}^{L_{j,m}}=g^{r_j x_m x_m^{-1} s_i}=g^{r_j s_i}$.

Figure 3:
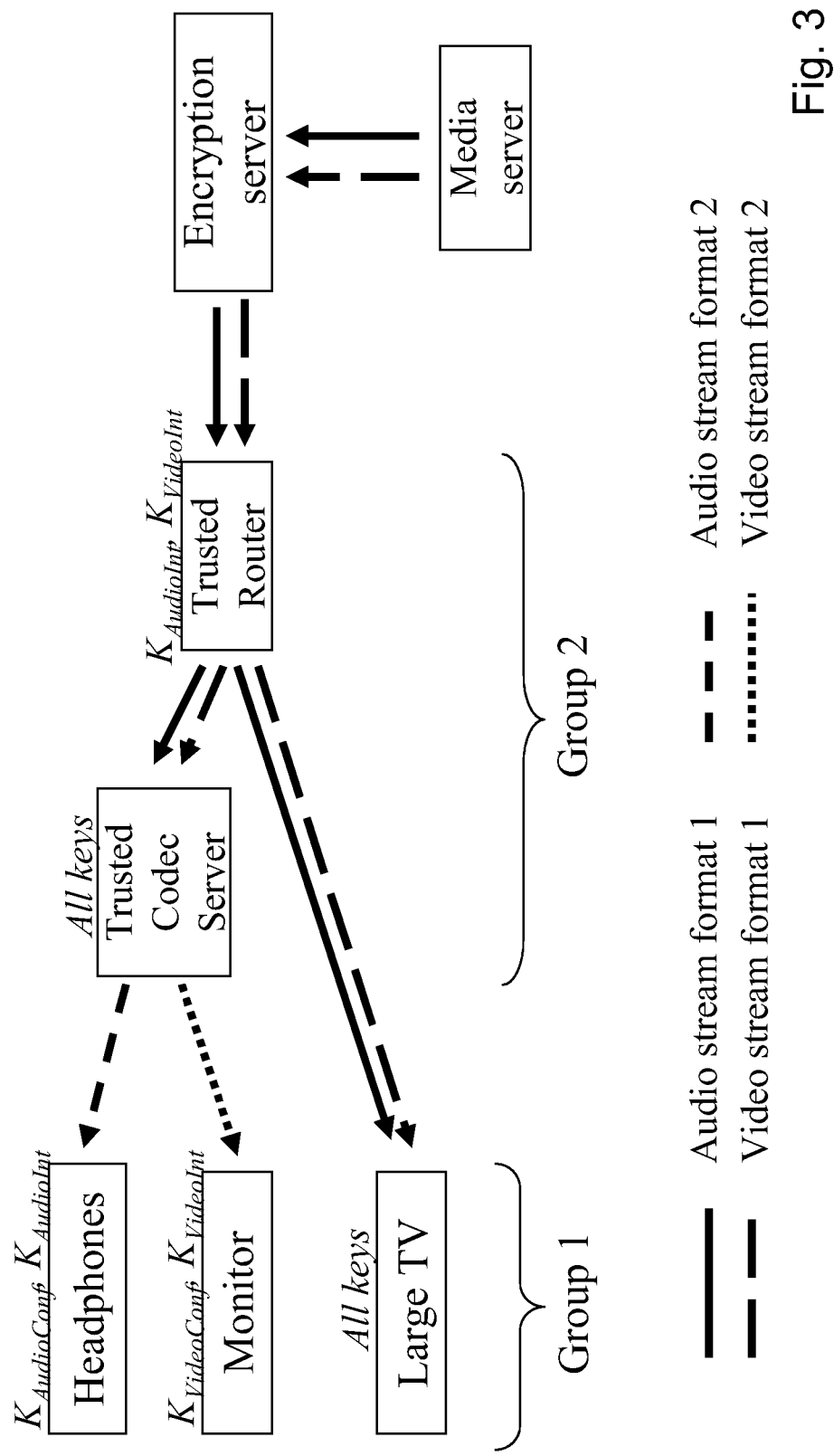
FIG. 3 is a description of the media flow in a set up using the invention for media delivery as described in a typical application of the present invention.
Figure 4:
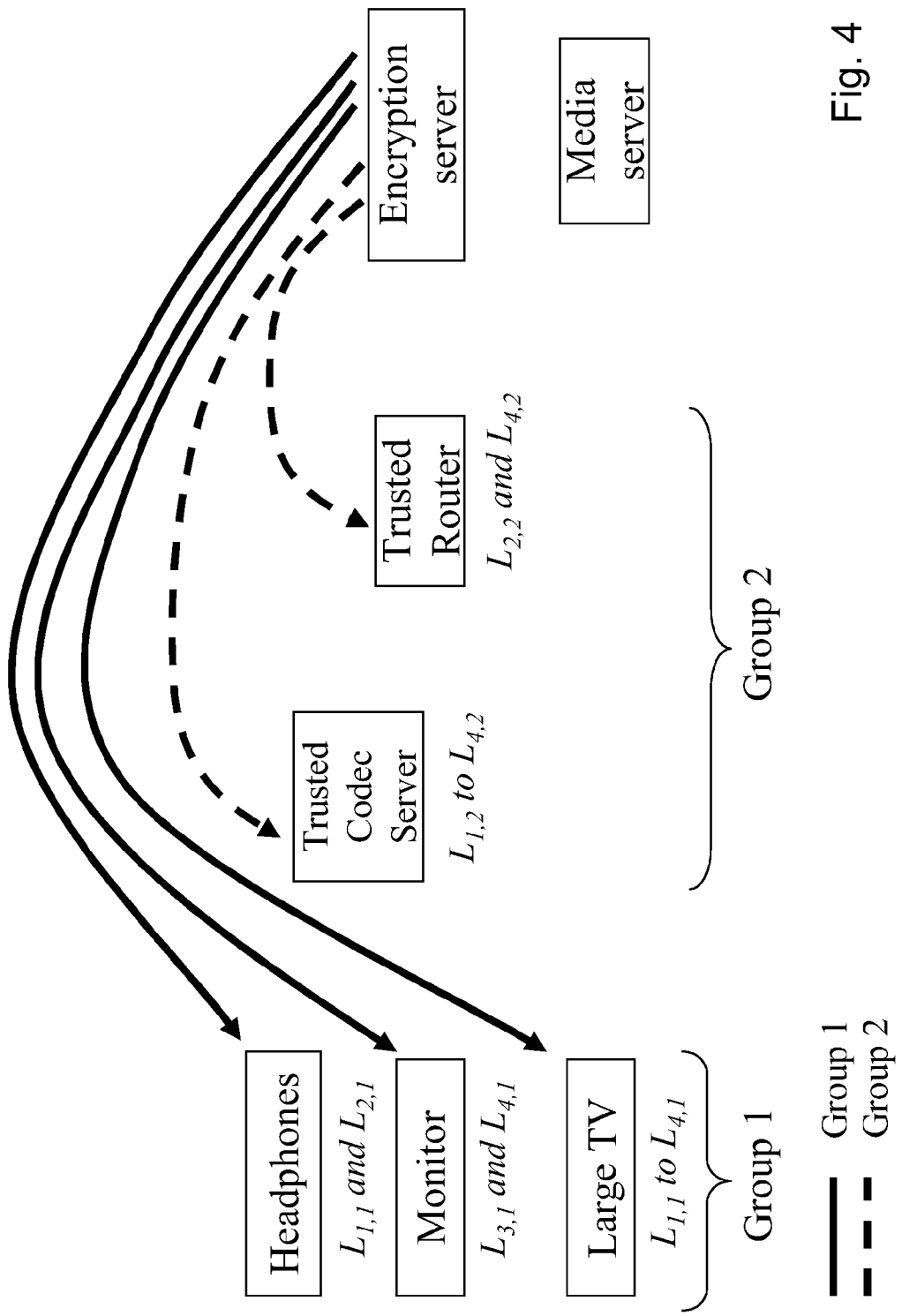
FIG. 4 is a description of the key management messages sent in the system according to the invention as described in FIG. 3. L denotes long term secrets.
Figure 5:
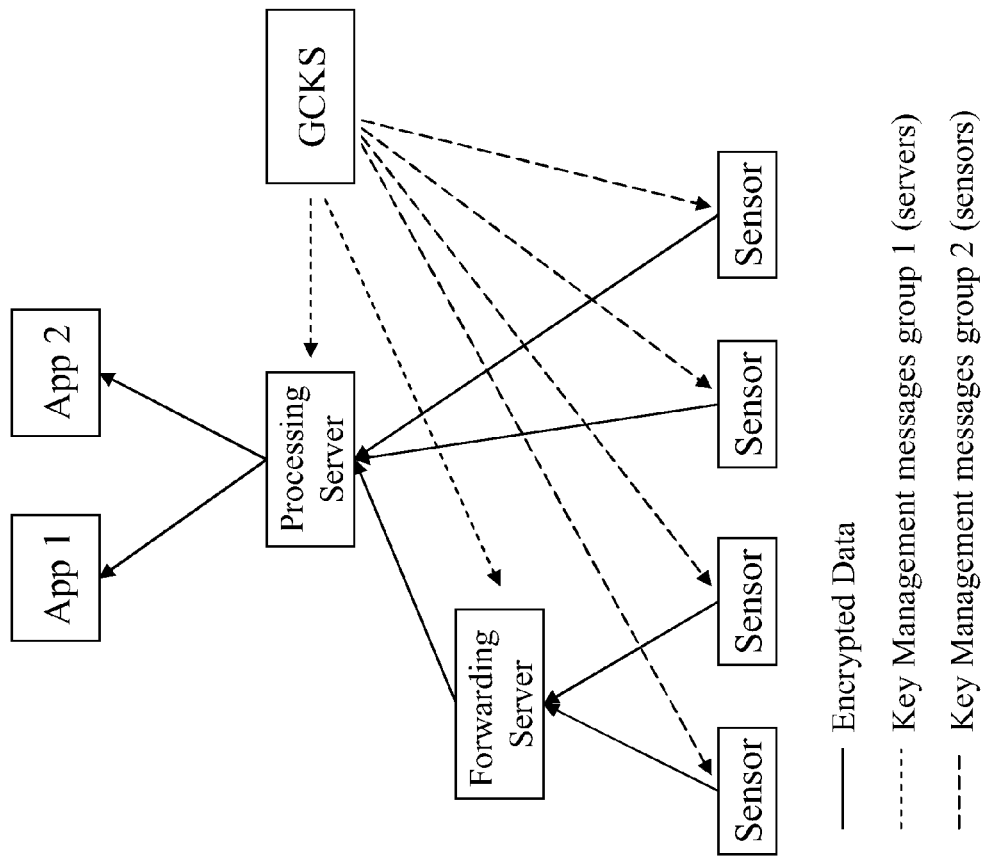
FIG. 5 is a description of the data flow in a set up using the invention for data collection and processing. App denotes the end-user service utilising the collected data for different purposes.

This facilitates management of changes and reducing the required number of updates. These new possibilities are illustrated in FIGS. 3-4, which represent practical scenarios where the invention would be used. In FIG. 3, the split end points are represented by for example the headphones and the monitor, which receive the protected audio and video streams, respectively. The headphones belong to the subgroup having long-term secrets relating to audio streams, and the monitor belongs to another subgroup having long-term secrets relating to video streams. The splitting of the two is thus made possible and thereby they are not mutually affected each time a user's corresponding audio or video streams are being modified. FIG. 3 also illustrates how routers having different trust levels may be grouped into different subgroups depending on their right to receive, read and distribute information, by showing one media router merely forwarding media streams in a trusted way (Trusted Router) and another actually modifying media streams (Trusted Codec Server).

Another use of the present invention relates to the collection and processing of data from a large amount of sensors. In this case different first user groups may comprise the sensors and the network servers. The sensors are then divided into subgroups depending on their capabilities, such as for instance if they are capable of measuring temperature, position or humidity. The networking servers are divided into subgroups depending on if they are just forwarding data in a trusted way (Forwarding Server) or if they are actually processing the data (Processing Server). Here processing means aggregating data, reacting to triggers, etc., and in general modifying and reacting to the data coming from multiple sources. The second user groups comprise the union of said subgroups. With this set-up, sensors with similar capabilities can communicate with each other and with the processing servers in a secure way, with a minimum overhead in key management.

Figure 6:
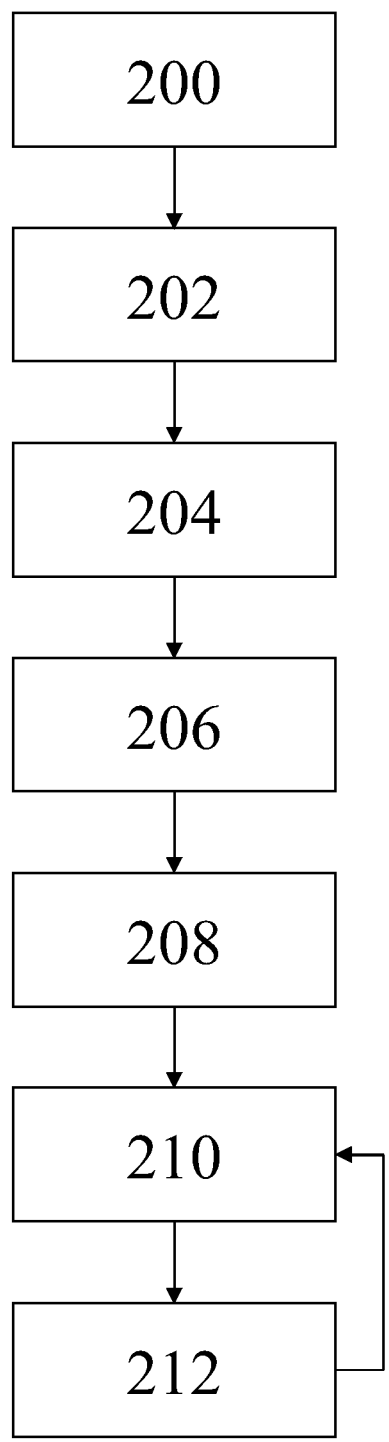
FIG. 6 is a description of the different states of the system, according to the present invention, presented as a flow chart.

The different steps in the system can be described with the help of FIG. 6, which illustrates an embodiment of a method according to the present invention, wherein step 200, said users are divided into different first user groups based on their user rights and/or behaviour;

step 202, a set of random long-term secrets $x_m$, each associated with the first user group the individual user belongs to, are created;

step 204, a set of random long-term secrets $s_i$, each associated with a second user group or sub-group the individual user belongs to, and based on said users capabilities (but s is only based on the second user group), are created;

step 206, a set of long-term secrets $L_{i,m}$ as a function q of the individual users' respective secrets $s_i$ and $x_m$, are computed;

step 208, the individual users of said subgroups are provided with their respective secrets $L_{i,m}$, which they will then store.

step 209, each member, or possible member, of the first user group receives the credentials required to participate in the traditional GKM scheme, step 210, a set of group keys $K_{Gm,j}$ are generated with the help of a function $f$, a random round secret $r_j$ and the respective group secrets $x_m$;

step 212, an encrypted message comprising said group keys $K_{Gm,j}$ are broadcast whereby each user of the respective subgroups decrypts the encrypted message and computes the usage key $K_{i,j}$ associated with their subgroup by using the long-term key $L_{i,m}$, the received group key $K_{Gm,j}$ and a function g.

In step 212, as memberships change in the first user group, the state is returned to 210.

It should also be clear for the person skilled in the art that some of the above steps may be carried out in different order than the above described order.

In a concrete example of the method according to the present invention, the long-term secrets $L_{i,m}$ may be distributed in secure parts of headphones. These secure parts may then be placed in the headphones in the manufacturing process. The secret $s_i$ may then signify the audio signal, and $x_m$ may for instance signify consumers on a specific continent. Another scenario could be that the $L_{i,m}$ are distributed after purchase when the device is registered to the user, whereby $s_i$ and $x_m$ having the similar meaning.

If there is a membership change in one first user group, this first user group must distribute a new $K_{Gm,j+1}$ using a traditional GKM scheme. The other first user groups however do not need to use the traditional GKM scheme but can reuse their existing $K_{Gm,j}$ or a derivation of it to securely transport the new $K_{Gm,j+1}$.

In order to simplify the description of the invention two exemplary embodiments will first be given. Thereafter a general method will be provided.

Figure 2:
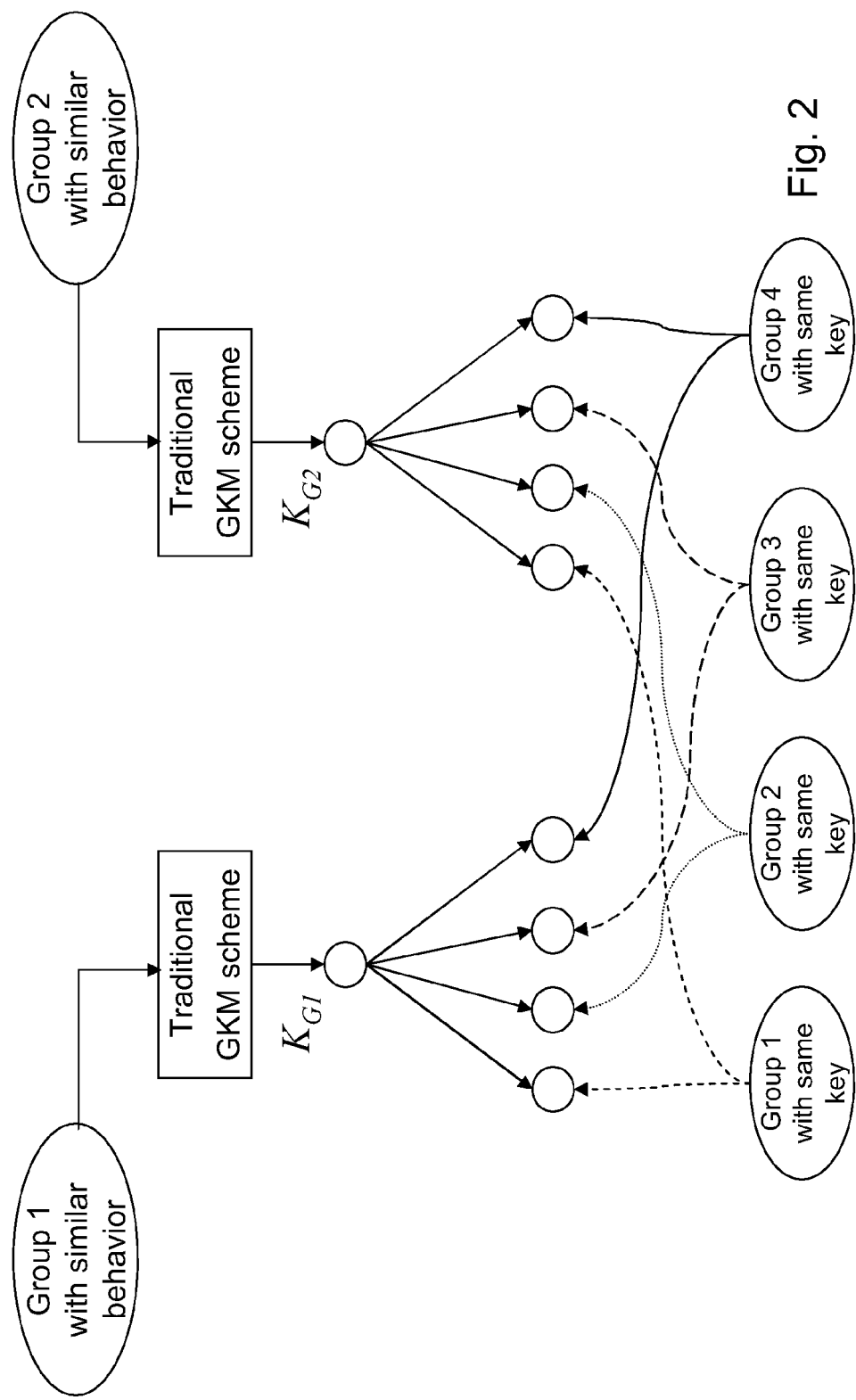

The first method is performed in the following way:

First, in a system of first user groups managed by a traditional key management method, the users belonging to said groups are divided into different subgroups based on their user rights and/or capabilities. An example of this is described in FIG. 2, where the upper half of the figure represents a system using traditional key management, and the lower part of the figure represents said subgroups managed by the key management method according to the present invention. Small and frequent changes and updates in the system are managed by the traditional scheme, whereas the infrequent ones are managed by the method according to the present invention.

In the next step the GCKS creates a set of random long-term secrets $s_i$ each associated with a second user group's usage base key $K_i$. The GCKS also creates a set of random long-term secrets $x_m$ each associated with the first user group $G_m$ the individual user belongs to. The secrets s and m are stored by the GCKS, and not distributed to any other group, subgroup or user. The GCKS then generates a set of long-term secrets L as a function q of the individual users' respective secrets $s_i$ and $x_m$. In this particular embodiment $L_{i,m} = q(s_i, x_m) = s_i \oplus x_m$. The GCKS then securely provides said individual users of said subgroups with their respective secrets $L_{i,m}$, which they will then store.

Then a set of group keys $K_{Gm,j}$, which is based on a random round secret $r_j$ generated in round j (denoting the version j of said change) and the respective group secrets $x_m$, are generated by the GCKS for each subgroup m. The round secret is only known to the GCKS, and not distributed to any other group, subgroup or user. The group keys are computed as $K_{Gm,j} = f(x_m, r_j) = x_m \oplus r_j$. These group keys are then broadcasted in round j as an encoded message to the members of the first user groups using a traditional GKM scheme. The users decrypt the encoded message using the secrets related to the traditional GKM scheme and compute the usage key $K_{i,j}$ associated with the second user group by using their respective long-term key $L_{i,m}$. $K_{i,j}$ is computed as the group key $K_{Gm,j}$ XOR:ed with the long-term key $L_{i,m}$, according to $K_{i,j} = g(L_{i,m}, K_{Gm,j}) = L_{i,m} \oplus K_{Gm,j} = s_i \oplus x_m \oplus x_m \oplus r_j = s_i \oplus r_j$.

Since all the above-mentioned secrets ($s_i$, $r_j$, and $x_m$) are only known to the GCKS, the long-term secret $L_{i,m}$ can only be computed if being in possession of the group key and the usage key.

Figure 7:
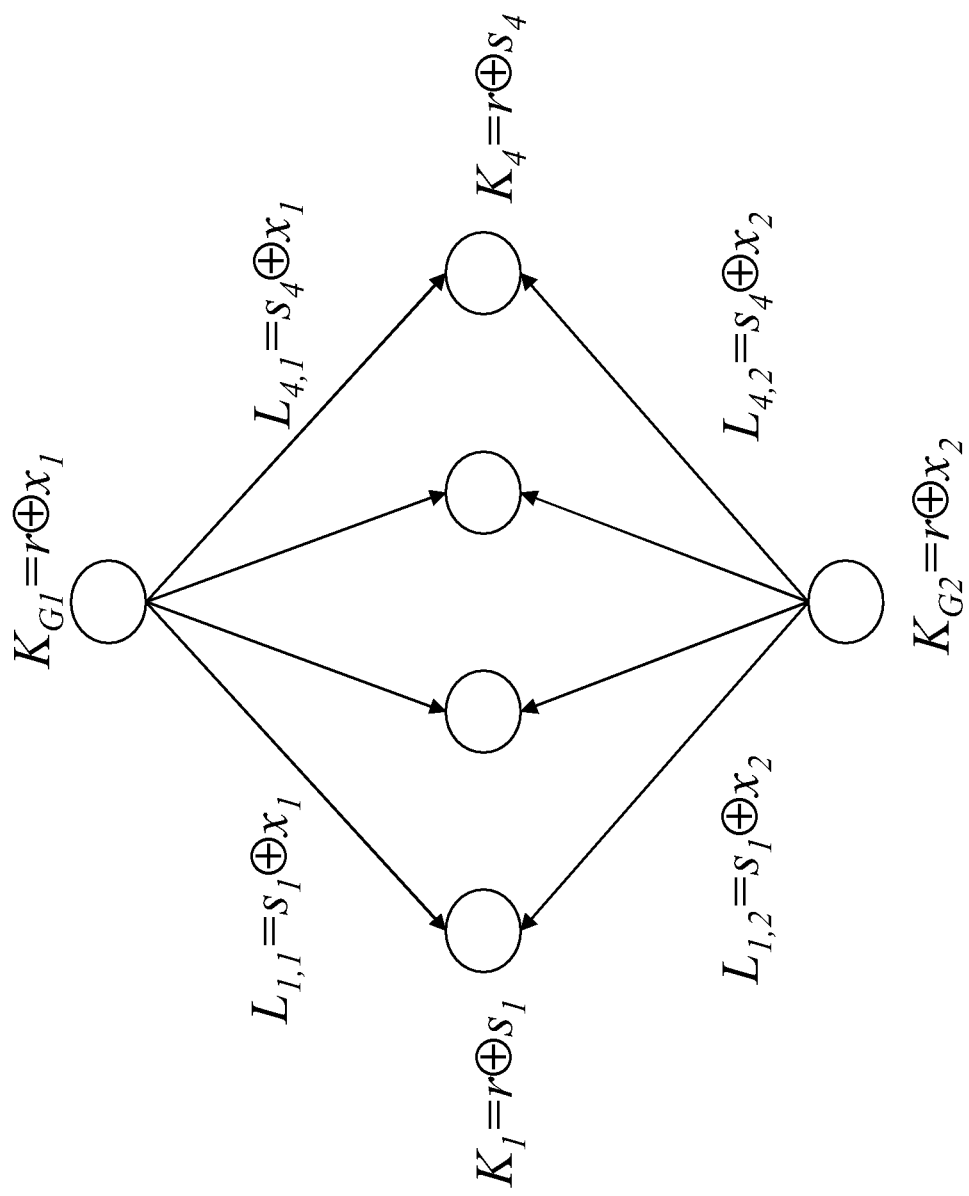
FIG. 7 is an embodiment of a first method, where two first user groups with members entitled to compute $K_1$ and $K_4$ are shown. The round index is not shown in this figure.

A graphical depiction of the first method is shown in FIG. 7.

In the second embodiment of the method according to the invention, the method according to the first embodiment is made more secure by using discrete logarithms in a manner that is inspired by the Diffie-Hellman method. More specifically, the assumption says that discrete logarithms of a randomly element in the algebraic group $Z_p^*$ is very difficult to compute, i.e., given a random element b and a generator $\gamma$ of the said group, it is difficult to compute a in the equation $b=\gamma^a$. The difficulty of such a mathematical operation is widely known throughout the scientific literature.

First, the GCKS randomly generates secret elements of the group $Z_p^*$ corresponding to the $s_i$, $r_j$, and $x_m$, based on the same criteria as in the first embodiment. The individual users of said subgroups are then provided with their respective secrets $L_{i,m}$, which they will then store. However, in this case $L_{j,m}=q(s_i,x_m)=s_i x_m^{-1}$.

The usage key, or second group key, is also generated from $s_i$ and $r_j$ as in the first embodiment, but in this case the usage key equals $\gamma^{s_i r_j}$ in round j. The group key broadcast to the first user group $G_m$, during session j, then equals $K_{G_m,j}=\gamma^{r_j x_m}$.

The entitled users may then compute the usage $K_{i,j}$ as $K_{G_m,j}$ raised to the long-term key $L_{i,m}$. $K_{i,j}$ is thus computed as $K_{i,j}=K_{G_m,j}^{L_{j,m}}=\gamma^{r_j x_m x_m^{-1} s_i}=\gamma^{r_j s_i}$, since the secrets $x_m$ and $x_m^{-1}$ also in this mathematical operation take out each other.

Figure 8:
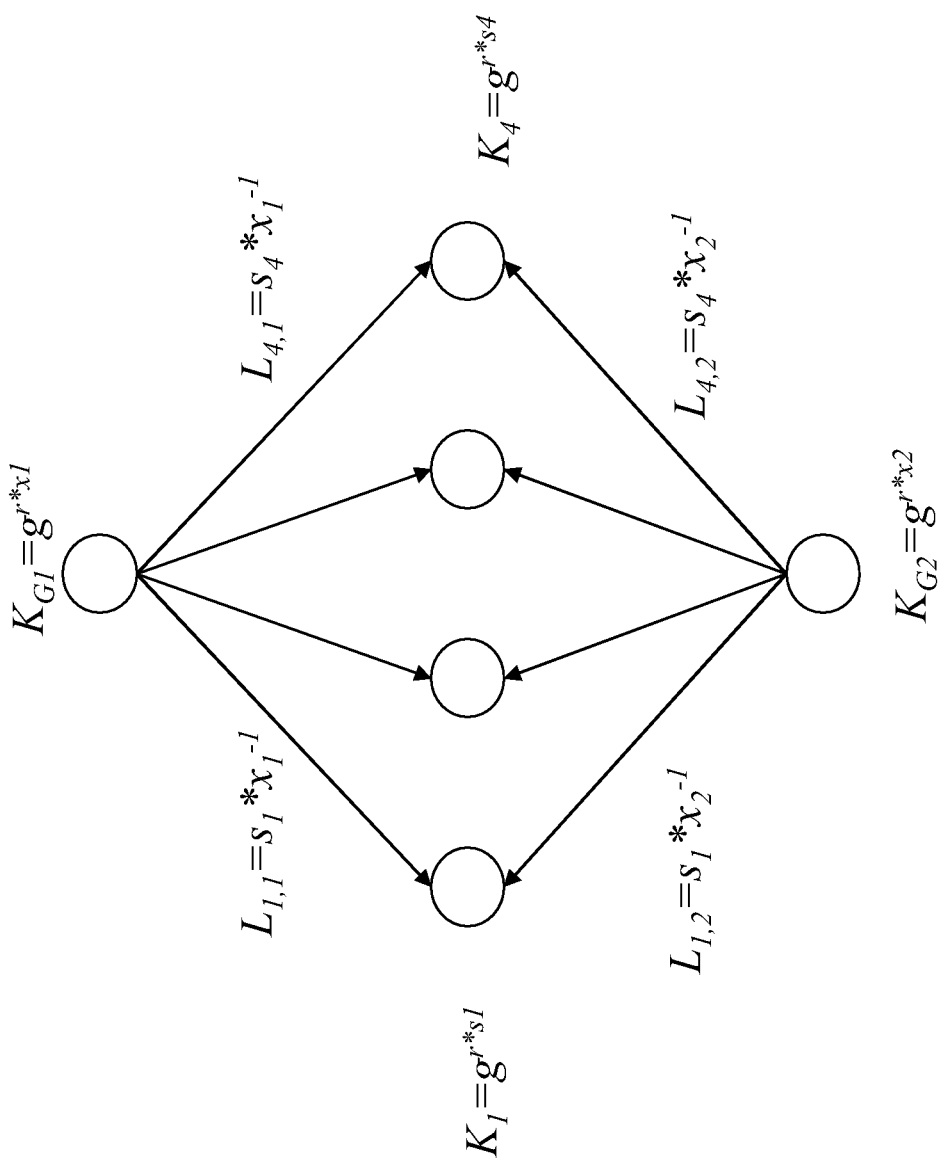
FIG. 8 is an embodiment of a second method, where two first user groups with members entitled to compute $K_1$ and $K_4$ are shown. The round index is not shown in this figure.

An example of the second method is depicted in FIG. 8.

The first method is somewhat less secure than the second, in the sense that knowledge of a group key and a usage key enables an attacker to compute the long-term key. The second method is more secure, since even if the group key and the usage key are known, the long-term key L can still not be computed.

The above mentioned secrets described herein as "random" or "randomly generated", may be for example be generated by a random number generator, or any other suitable means for producing a random secret number.

A general method will now be described encompassing the two previously defined methods.

In the following, let any algebraic group be denoted by G. We require f, g, and h to be surjective one-to-one mappings in the second argument $f$, $g$, $h:G \times G \to G$. These mappings are referred to as permutations, and more precisely:

1) $f,g,h(k, X \in G)$ are permutations as X varies and k is a constant and $f,g,h:G \times G \to G$ $K_{i,j}$ is further defined as $g(L_{i,m},f(x_m,r_j \in G))=h(s_i,r_j \in G)=K_{i,j}$. Here $L_{i,m}=q(s_i, x_m)$ and q is a mapping $q:G \times G \to G$, such that:

2) $\exists q \forall s_i \forall x_m: g(q(s_i,x_m),f(x_m,r_j))=h(s_i,r_j)$.

It is noted that, due to the permutation requirement 1), a uniformly distributed second input X, with fixed k, results in a uniform distribution of the mapped values by mapping g. This property is important for the generation of security key K.

It is tacitly assumed that all inputs and outputs of $f$, g, and h belong to the same set G. This assumption may be relaxed to obtain other solutions as understood by the skilled person.

The requirement (2) of the existence of function q, is needed to be able to reconstruct $K_{ij}$.

Two examples of functions fulfilling the criteria discussed in detail above, are:

$f$, g, h, and q are bitwise-XOR functions:

$f,g,h=k \oplus X$ and $q=L_{i,m}=s_i \oplus x_m$

The second example is based on selecting $G=Z_p^* \cong Z_{p-1}^+$ and the discrete logarithm problem:

$f,g,h=\gamma^{kX} \mod(p)$ where $k, X \in Z_{p-1}^+$ $q=s_i x_m^{-1} \mod(p)$

Two other possible choices, not previously discussed, are: $G=Z_n^{\pm}$ where:

$f,g,h=k+X$ $q=s_i+x_m$ and $G=Z_n^*$: where:

$f,g,h=kX \mod(n)$ where $k,X \neq 0$ $q=s_i x_m^{-1} \mod(n)$.

Figure 9:
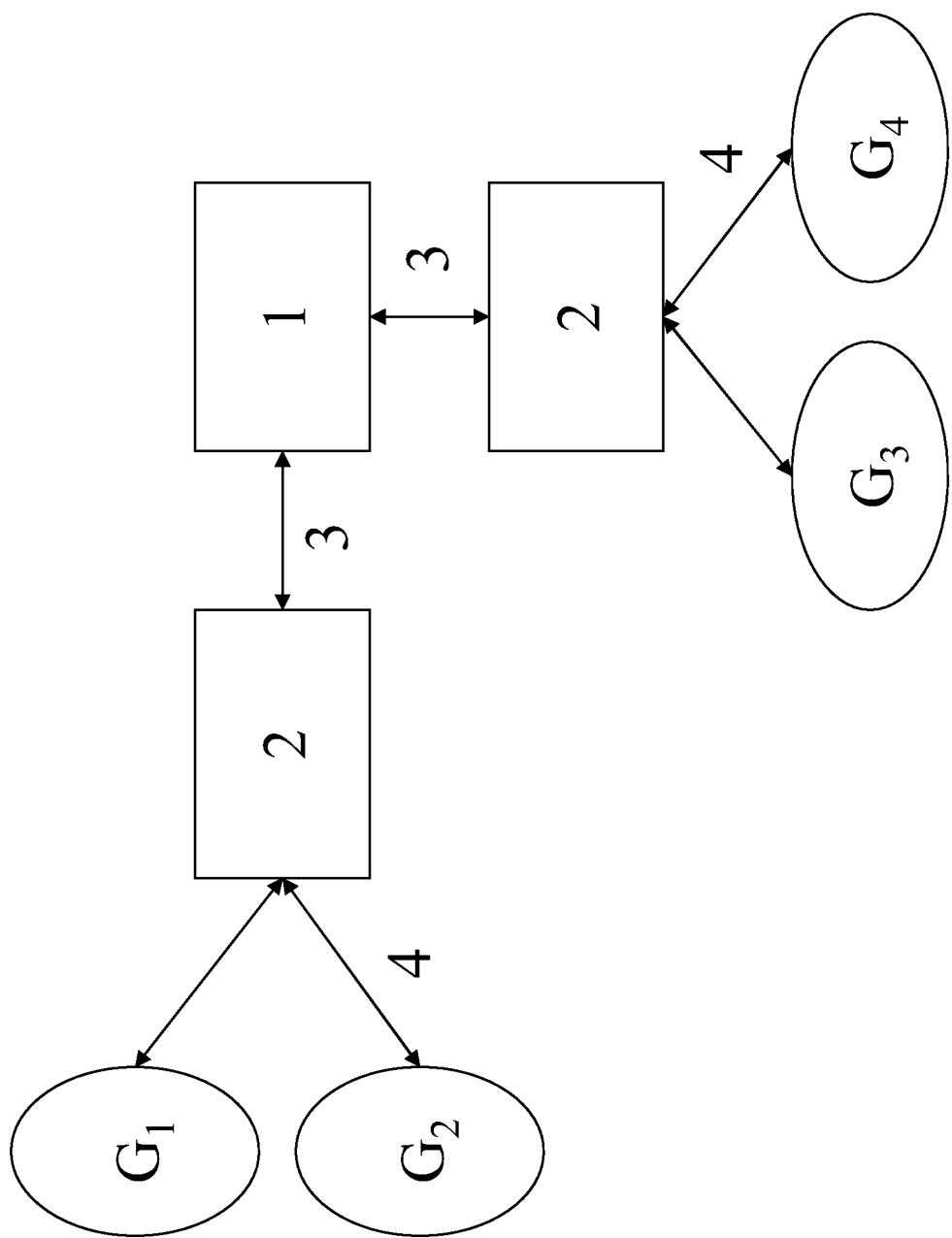
FIG. 9 is an embodiment of the GCKS where some functionalities are central and some are local.

The GCKS node may be implemented in two separate units as illustrated in FIG. 9. A first central node 1 generates and stores long term secrets $s_i$ and $x_m$ and the long term secret $L_{i,m}$. The central node 1 distributes (3) $x_m$ to a local key node 2 wherein a random round key $r_j$ is generated and combined with $x_m$ to form $K_{G_m,j}$, which is further distributed to the respective group $G_m$ (in FIG. 9 exemplified with $G_1$, $G_2$, $G_3$, and $G_4$) using a traditional key management method (4). Thus, the first node manages long term entities whereas the local node manages dynamic updates of user keys $K_{G_m,j}$.

The above mentioned secrets described herein as "random" or "randomly generated", may for example be generated by a random number generator, or any other suitable means for producing a random secret number.

REFERENCES

1. M. Johansson, M, Georgiades, "Efficient Multicast Security Solutions in Ambient Networks", IST Mobile Summit 2006, Mykonos, Greece June 2006
2. D. Wallner, E. Harder, and R. Agee, "Key Management for Multicast: Issues and Architectures", RFC2627, IETF, 1999.
3. D. Naor, M. Naor, and J. Lotspiech, "Revocation and Tracing Schemes for Stateless Receivers", in Advances in Cryptology—CRYPTO, Santa Barbara, Calif.: Springer-Verlag Inc., LNCS 2139, 2001.
4. H. Ragab Hassan, A. Bouabdallah, H. Bettahar, and Y. Challal, "Hi-KD: Hash-based hierarchical Key Distribution for Group Communication", IEEE INFOCOM2005, 2005.
5. M. Atallah, K. Frikken, and M. Blanton, "*Dynamic and Efficient Key Management for Access Hierarchies*", in Proceedings of the 12th ACM conference on Computer and communications security, 2005
6. Fredrik Lindholm and Gunnar Kreitz, "IMPROVED KEY DISTRIBUTION IN SYSTEMS FOR SELECTIVE ACCESS TO INFORMATION", patent application No WO2004SE0001676, filed Nov. 16, 2004

The invention claimed is:

1. A key management method wherein a number of user subgroups is selected, from a plurality $G_m$ of user groups each supporting an instance of a key distribution method M for receiving distributed key material, wherein each subgroup is capable of computing a usage security key based on the distributed key material and pre-defined user group key material and wherein the usage security key for users in the subgroup is generated, broadcasted and used according to the following steps:

distributing, to each user entitled to a usage security key $K_i$, a long term secret $L_{i,m}$;
    broadcasting, according to a key distribution method M, an instance j of a group key $K_{G_m,j}$ to each user in group $G_m$;
    a user i in group $G_m$ computing an instance $K_{i,j}$ of the usage security key $K_i$, as a function of $L_{i,m}$ and $K_{G_m,j}$; and user i using the usage security key $K_{i,j}$ for processing information.

2. The method of claim 1 wherein the instance j of a group key $K_{G_m,j}$ is calculated as $f(x_m,r_j)$ wherein $r_j$ is a random number associated with instance j, $x_m$ is a long term secret and $f$ is a surjective one-to-one mapping in the second argument $f: G \times G \to G$ of an algebraic group G.

3. The method of claim 2 wherein the instance of a group key $K_{G_m,j}$ is calculated as $K_{G_m,j} = r_j$ XOR $x_m$.

4. The method of claim 2 wherein $K_{i,j}$ is calculated as $g(L_{i,m}, f(x_m,r_j \in G)) = h(s_i, r_j \in G) = K_{i,j}$ wherein g, h are surjective one-to-one mappings in the second argument $G \times G \to G$ and the long term secret $L_{i,m}$ is calculated as $L_{i,m} = q(s_i, x_m)$ wherein $s_i$ is a long term secret and wherein q is a mapping $q: G \times G \to G$, such that: $\exists q \forall s_i \forall x_m : g(q(s_i, x_m), f(x_m, r_j)) = h(s_i, r_j)$.

5. The method according to claim 4 wherein the long term secret $L_{i,m}$ is calculated as $L_{i,m} = s_i$ XOR $x_m$, whereby said instance $K_{i,j}$ of a usage key $K_i$ is calculated as $K_{i,j} = K_{G_m,j} \oplus L_{i,m} = r_j \oplus x_m \oplus s_i \oplus x_m = s_i \oplus r_j$.

6. The method according to claim 2 wherein $K_{G_m,j} = g^{r_j x_m}$ wherein g is a generator of a group $Z_p^*$.

7. The method according to claim 4 wherein $L_{j,m} = s_i x_m^{-1}$, whereby said instance $K_{i,j}$ of a usage key $K_i$ is calculated as $K_{i,j} = K_{G_m,j}^{L_{j,m}} = g^{r_j x_m x_m^{-1} s_i} = g^{r_j s_i}$.

8. A central group control and key server for use in the key management method defined in claim 2, and configured for:
   creation of key material associated with user groups $G_m$ and subgroups selected therefrom;
   generation of at least a long term secret $L_{i,m} = q(s_i; x_m)$ where $s_i$ is a long term secret associated with a usage key $K_i$, $x_m$ is a long term secret associated with user group $G_m$ and q is a function as defined in claim 2;
   output of $L_{i,m}$ for providing users in group $G_m$;
   output of $x_m$; and
   output of an instance j of a group key $K_{G_m,j}$.

9. The central group control and key server of claim 8 wherein the instance j of a group key $K_{G_m,j}$ is calculated as $f(x_m, r_j)$ wherein $r_j$ is a random number associated with instance j, $x_m$ is a long term secret and $f$ is a surjective one-to-one mapping in the second argument $f: G \times G \to G$ of an algebraic group G.

10. The central group control and key server of claim 9 wherein the instance of a group key $K_{G_m,j}$ is calculated as $K_{G_m,j} = r_j$ XOR $x_m$.

11. The central group control and key server of claim 9 wherein $K_{i,j}$ is calculated as $g(L_{i,m}, f(x_m, r_j \in G)) = h(s_i, r_j \in G) = K_{i,j}$ wherein g, h are surjective one-to-one mappings in the second argument $G \times G \to G$ and the long term secret $L_{i,m}$ is calculated as $L_{i,m} = q(s_i, x_m)$ wherein $s_i$ is a long term secret and wherein q is a mapping $q: G \times G \to G$, such that: $\exists q \forall s_i \forall x_m : g(q(s_i, x_m), f(x_m, r_j)) = h(s_i, r_j)$.

12. The central group control and key server according to claim 11, wherein the long term secret $L_{i,m}$ is calculated as $L_{i,m} = s_i$ XOR $x_m$, whereby said instance $K_{i,j}$ of a usage key $K_i$ is calculated as $$K_{i,j} = K_{G_m,j} \oplus L_{i,m} = r_j \oplus x_m \oplus s_i \oplus x_m = s_i \oplus r_j.$$

13. The central group control and key server according to claim 9 wherein $K_{G_m,j} = g^{r_j x_m}$ wherein g is a generator of a group $Z_p^*$.

14. The central group control and key server according to claim 11 wherein $L_{j,m} = s_i x_m^{-1}$, whereby said instance $K_{i,j}$ of a usage key $K_i$ is calculated as $K_{i,j} = K_{G_m,j}^{L_{j,m}} = g^{r_j x_m x_m^{-1} s_i} = g^{r_j s_i}$.

15. A local group control and key server for use in the key management method defined in claim 2 and supporting broadcasting method M for key distribution to user groups $G_m$ and subgroups selected therefrom, the local group control and key server configured for:
   receiving from a central group control and key server a long term secret $x_m$;
   forming an instance j of a group key $K_{G_m,j} = f(r_j; x_m)$ associated with group $G_m$, wherein $f$ is a function as defined in claim 2;
   generating a round key $r_j$; and
   broadcasting, using the method M, said group keys to selected members of groups $G_m$.

16. The local group control and key server of claim 15 wherein the instance j of a group key $K_{G_m,j}$ is calculated as $f(x_m, r_j)$ wherein $r_j$ is a random number associated with instance j, $x_m$ is a long term secret and $f$ is a surjective one-to-one mapping in the second argument $f: G \times G \to G$ of an algebraic group G.

17. The local group control and key server of claim 16 wherein the instance of a group key $K_{G_m,j}$ is calculated as $K_{G_m,j} = r_j$ XOR $x_m$.

18. The local group control and key server of claim 16 wherein $K_{i,j}$ is calculated as $g(L_{i,m}, f(x_m, r_j \in G)) = h(s_i, r_j \in G) = K_{i,j}$ wherein g, h are surjective one-to-one mappings in the second argument $G \times G \to G$ and the long term secret $L_{i,m}$ is calculated as $L_{i,m} = q(s_i, x_m)$ wherein $s_i$ is a long term secret and wherein q is a mapping $q: G \times G \to G$, such that: $\exists q \forall s_i \forall x_m : g(q(s_i, x_m), f(x_m, r_j)) = h(s_i, r_j)$.

19. The local group control and key server according to claim 18, wherein the long term secret $L_{i,m}$ is calculated as $L_{i,m} = s_i$ XOR $x_m$, whereby said instance $K_{i,j}$ of a usage key $K_i$ is calculated as $$K_{i,j} = K_{G_m,j} \oplus L_{i,m} = r_j \oplus x_m \oplus s_i \oplus x_m = s_i \oplus r_j.$$

20. The local group control and key server according to claim 16 wherein $K_{G_m,j} = g^{r_j x_m}$ wherein g is a generator of a group $Z_p^*$.

21. The local group control and key server according to claim 18 wherein $L_{j,m} = s_i x_m^{-1}$, whereby said instance $K_{i,j}$ of a usage key $K_i$ is calculated as $K_{i,j} = K_{G_m,j}^{L_{j,m}} = g^{r_j x_m x_m^{-1} s_i} = g^{r_j s_i}$.

22. The local group control and key server according to claim 15, wherein the local group control and key server is co-localized and shares central group control functionality with the central group control and key server.

23. A usage entity supporting the key management method defined in claim 1 and configured for:
   supporting a broadcast method M belonging to a user group $G_m$ for processing information protected by an instance of a usage security key $K_i$;
   receiving and storing a long term secret $L_{i,m}$;
   receiving a broadcast message according to a broadcast method M using said group key management method, including an instance of a group key $K_{G_m,j}$;
   generating an instance $K_{i,j}$ of the usage security key $K_i$ by applying a function to said $L_{i,m}$ and $K_{G_m,j}$; and
   receiving protected information for processing using the instance $K_{i,j}$ of usage key $K_i$.

24. The usage entity of claim 23 wherein the instance j of a group key $K_{G_m,j}$ is calculated as $f(x_m, r_j)$ wherein $r_j$ is a random number associated with instance j, $x_m$ is a long term secret and $f$ is a surjective one-to-one mapping in the second argument $f: G \times G \to G$ of an algebraic group G.

25. The usage entity of claim 24 wherein the instance of a group key $K_{G_m,j}$ is calculated as $K_{G_m,j} = r_j$ XOR $x_m$.

26. The usage entity of claim 24 wherein $K_{i,j}$ is calculated as $g(L_{i,m}, f(x_m, r_j \in G)) = h(s_i, r_j \in G) = K_{i,j}$ wherein g, h are surjective one-to-one mappings in the second argument $G \times G \to G$ and the long term secret $L_{i,m}$ is calculated as $L_{i,m} = q(s_i, x_m)$ wherein $s_i$ is a long term secret and wherein q is a mapping $q: G \times G \to G$, such that: $\exists q \forall s_i \forall x_m : g(q(s_i, x_m), f(x_m, r_j)) = h(s_i, r_j)$.

27. The usage entity according to claim 26 wherein the long term secret $L_{i,m}$ is calculated as $L_{i,m} = s_i \text{ XOR } x_m$, whereby said instance $K_{i,j}$ of a usage key $K_i$ is calculated as $K_{i,j} = K_{G_m,j} \oplus L_{i,m} = r_j \oplus x_m \oplus s_i \oplus x_m = s_i \oplus r_j$.

28. The usage entity according to claim 24 wherein $K_{G_m,j} = g^{r_j x_m}$ wherein g is a generator of a group $Z_p^*$.

29. The usage entity according to claim 26 wherein $L_{j,m} = s_i x_m^{-1}$, whereby said instance $K_{i,j}$ of a usage key $K_i$ is calculated as $K_{i,j} = K_{G_m,j}^{L_{j,m}} = g^{r_j x_m x_m^{-1} s_i} = g^{r_j s_i}$.

* * * * *

UNITED STATES PATENT AND TRADEMARK OFFICE
CERTIFICATE OF CORRECTION

PATENT NO. : 8,594,334 B2  Page 1 of 1
APPLICATION NO. : 13/141435
DATED : November 26, 2013
INVENTOR(S) : Lindholm et al.

It is certified that error appears in the above-identified patent and that said Letters Patent is hereby corrected as shown below:

In the Specification

In Column 9, Line 58, delete "broadcast whereby" and insert -- broadcast, whereby --, therefor.

Signed and Sealed this
Fifteenth Day of July, 2014

Michelle K. Lee
*Deputy Director of the United States Patent and Trademark Office*